Dec. 4, 1928.  
W. A. PERRY ET AL  
1,693,991  
EARTH WORKING APPARATUS  
Filed March 20, 1925  
2 Sheets-Sheet 1
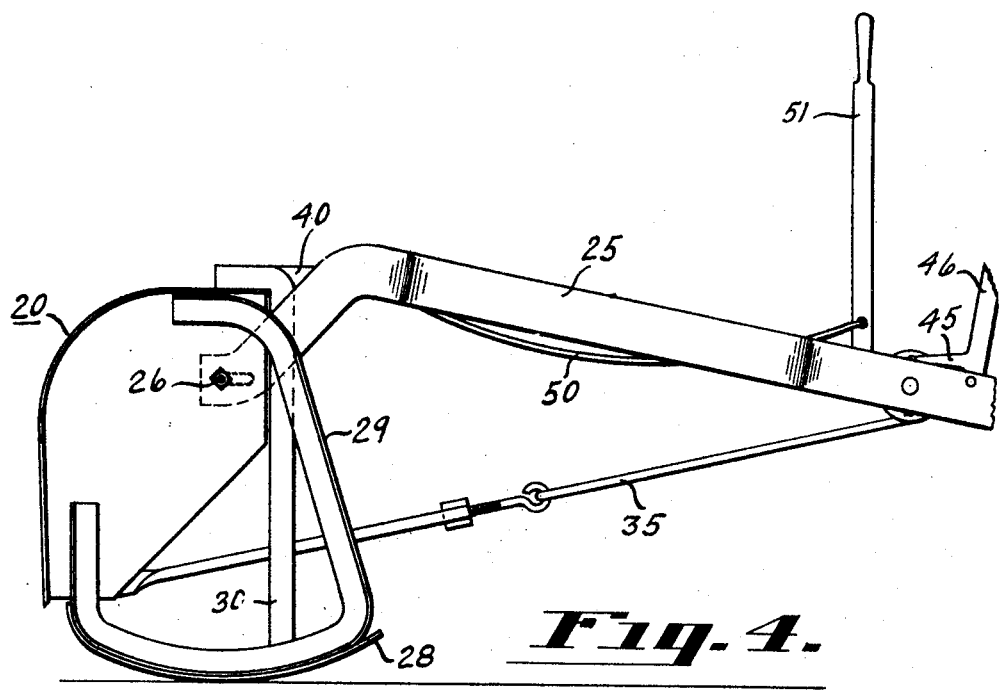
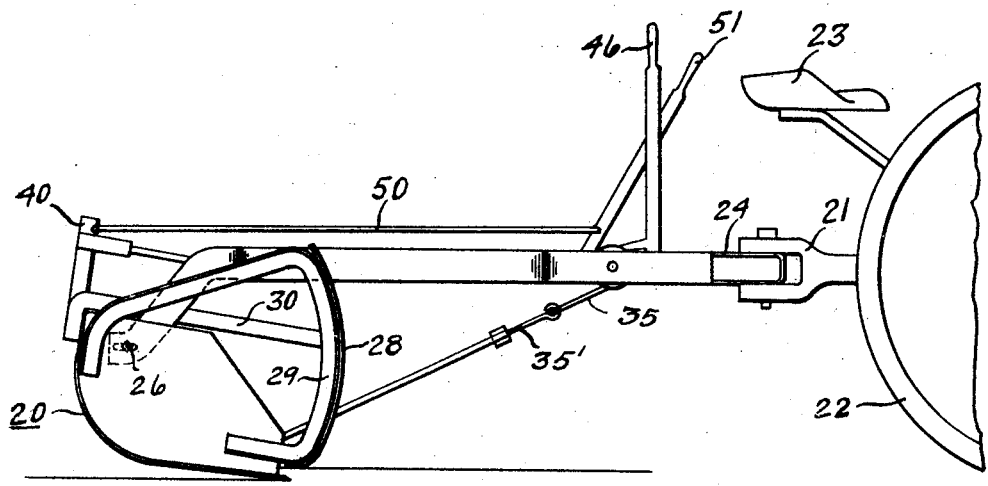
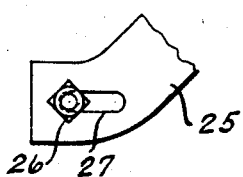
Inventor  
William A. Perry  
and George D. Toy  
By Maréchal + Fehr  
Attorneys Dec. 4, 1928.  W. A. PERRY ET AL  1,693,991
EARTH WORKING APPARATUS
Filed March 20, 1925   2 Sheets-Sheet 2

Inventor
William A. Perry
and George D. Toy
By Maréchal & Fehr
Attorneys

Patented Dec. 4, 1928.

1,693,991

UNITED STATES PATENT OFFICE.

WILLIAM ALBERT PERRY AND GEORGE DANIEL TOY, OF SIDNEY, OHIO; SAID TOY ASSIGNOR TO SAID PERRY.

EARTH-WORKING APPARATUS.

Application filed March 20, 1925. Serial No. 16,946.

The present invention relates to earth working apparatus and particularly earth working apparatus of the type adapted to be drawn over the ground and having an earth working element or scraper in engagement therewith.

One of the principal objects of the present invention is to provide an earth working machine adapted to be drawn by a tractor and having means operable from the driver's seat of the tractor for controlling the relation of the earth engaging element relative to the ground.

Another object of the invention is to provide an earth working machine having an earth engaging element or scraper, and novel means for controlling the relation of the earth engaging element to the ground.

Further objects and advantages of the present invention will be apparent from the following description taken in connection with the accompanying drawings, in which:

Fig. 1 is a side elevation of the earth working machine shown connected to a tractor and showing the earth working element or scraper in its scraping or digging position;

Fig. 4 is an enlarged side elevation showing the scraper in its dumping position; and Figs. 5 and 6 are fragmentary views showing details of construction.

Figure 2:
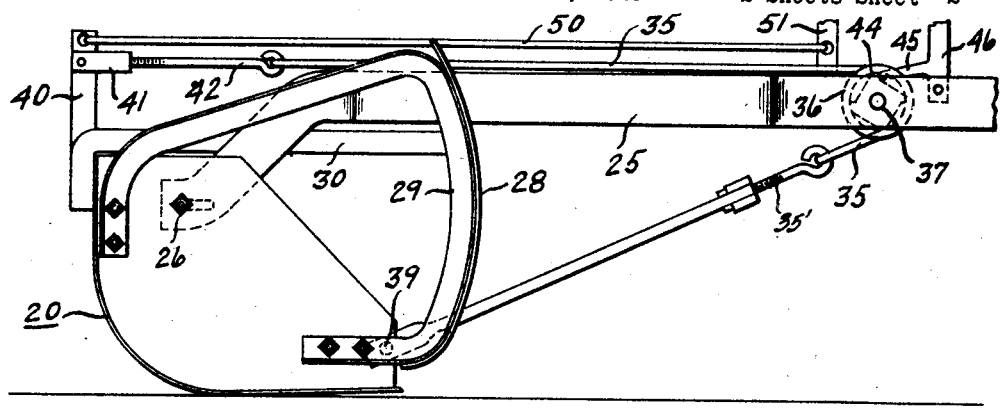
Fig. 2 is an enlarged side elevation showing the scraper in its carrying position.

Referring to the drawings the earth working machine comprises an earth working element 20 herein shown as a scraper of the shovel or Fresno type, which element is connected by means of forwardly extending draft and scraper-setting means with the draft device 21 of a tractor 22, the driver's seat of the tractor being indicated at 23.

The draft means for the earth working machine consists of a block or head 24, to which are secured draft bars or members 25 the forward portions of which are parallel and secured to opposite sides of the block 24 and the rearward portions of which diverge and are pivotally connected with the side walls of the earth scraper or shovel by means of the pivot pins or bolts 26. The earth scraper 20 is adapted to move or rock about the horizontal axis formed by the bolts 26. The apertures or openings in the draft bars 25 through which the bolts 26 pass, are elongated in a horizontal or backward and forward direction as indicated at 27 in full lines in Fig. 5 and in dotted lines in other figures, thus providing a lost motion connection for a purpose to be hereinafter described. To facilitate the forward rolling movement of the earth scraper 20 into its dumping position, which is one of the usual positions which may be taken by an earth scraper of the shovel type, the earth scraper is provided at its opposite forward side portions with curved runners or shoes 28 which are secured to the earth scraper in any suitable manner as by means of the runner angle iron members 29 and the runner bracing members 30.

The scraper setting or control mechanism comprises generally an elongated flexible member or loop indicated generally at 35, the opposite ends of the flexible member or loop being connected or secured to the earth scraper at opposite sides of the pivotal connection 26, as best shown in Fig. 2, that is, one end of the flexible member is connected to the scraper below the horizontal axis 26 while the other end is connected above the axis 26. The elongated flexible member 35 extends forwardly from the earth scraper to the forward portions of the draft means and passes around a suitable sheave or sprocket wheel 36 which is mounted for rotation upon the shaft 37 between the forward parallel portions of the draft bar members 25. The flexible member 35 may be a chain or a cable and may be connected to the scraper either directly or indirectly. Preferably the connection is effected through intermediate rigid members which are so arranged as also to provide adjustment of the flexible member with reference to the scraper. In the embodiment illustrated the downwardly and rearwardly extending end of the flexible member or chain 35 has a screw-threaded eye bolt 35' connected with the middle portion of a rigid bracket or hound 38 the end portions of which are pivotally secured at 39 to the side walls of the scraper adjacent the lower forward edges thereof. The upper and rearwardly extending end of the flexible member or chain 35 is attached to an arm or bracket 40 extending upwardly from the rear wall of the scraper, the attachment being effected by means of a yoke 41 pivoted to the arm 40.

Secured to the sprocket wheel or sheave 36 between the forward parallel portions of the draft bars 25 is a ratchet wheel 44 the teeth of which are adapted to be engaged by the pawl 45 mounted upon the pivoted operating lever 46. The pawl and ratchet construction 44 and 45 herein described together with the sheave or sprocket wheel 36 in engagement with the chain 35, constitutes in effect a gripping mechanism for restraining movement of the flexible member in one direction while permitting free movement of the flexible member in the opposite direction, the restraining action of the gripping mechanism being controllable to permit free movement of the flexible member in both directions, as desired. The length of the flexible member 35 may be adjusted at 35' to establish the desired relation between the lower front portion of the scraper 20 and the remainder of the apparatus as for example during carrying as shown in Fig. 2. The eye bolt 42 which carries an adjusting nut 43 serves as means for adjusting the length of the upper part of the flexible member 35.

A second flexible member 50 is secured to the upwardly extending arm 40 for the purpose of controlling the movement of the scraper 20 about its pivotal axis 26 for certain purposes, the forward end of the flexible member 50 being connected to and operated by means of the pivoted control lever 51. Both of the control levers 46 and 51 are mounted in such position that they are at all times in easy operating reach of the operator of the tractor sitting upon the driver's seat 23.

Figure 3:
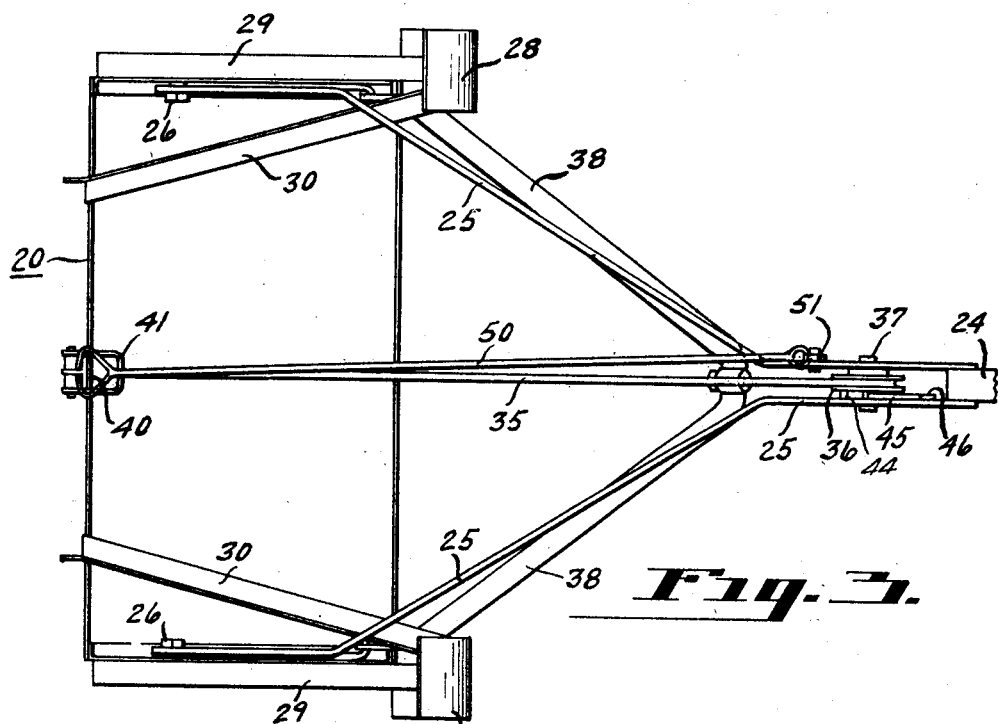
Fig. 3 is a plan view of Fig. 2.
Figure 6:
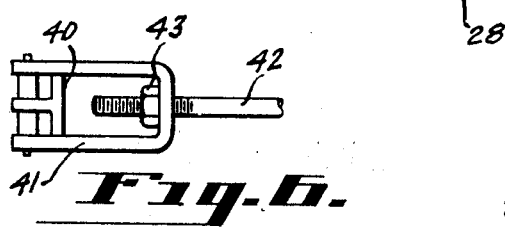

In the operation of the earth working machine and assuming that the machine is being drawn by the tractor 22 and that the shovel scraper 20 is in the carrying position as shown in Figs. 2 and 3, it will be seen upon reference to these figures that the scraper element 20 is being drawn by the draft means through the bolt or pivotal connection 26 and also by the flexible member 35. Should it now be desired to bring the forward or cutting edge of the scraper 20 into working engagement with the ground, this may be accomplished by operation of the control lever 51 by which the rear end of the scraper 20 is tilted or drawn forwardly, the bolt 26 sliding in the slot 27 of the draft arm 25, as indicated in Fig. 1 of the drawings. The angular relation of the bottom wall of the scraper 20 with reference to the ground may be varied as desired by movement of the control lever 51.

Assuming that the scraper 20 has been moved to scraping position by operation of the lever 51 and that it is now desired to return the scraper to its carrying position this may be accomplished by simply releasing the operating lever 51 to permit the upper rear portion of the scraper to move rearwardly the pivot bolt 26 sliding rearwardly in the slot 27 to its original position shown in Fig. 2. This will be clear since the load in the shovel is so disposed that its weight will cause this positioning.

To move the scraper to dumping position in order to discharge the contents of the scraper while the tractor is in motion, the operating handle 46 is moved forwardly to cause disengagement of the pawl 45 and ratchet 44. The frictional resistance between the lower part of the scraper 20 and the ground combined with the forward pull of the draft members 25 on the upper part of the scraper at 26, causes the shovel scraper 20 to roll forwardly upon the runners 28 to the dumping position shown in Fig. 4. The scraper 20 may be reset or returned to the carrying position shown in Fig. 2 by backing the tractor, the pawl and ratchet 44 and 45 permitting free movement of the flexible member 35 from the position shown in Fig. 4 to that illustrated in Fig. 2.

From the foregoing it will be apparent that the present invention provides a simple, sturdy and reliable device for drawing an earth working implement and for controlling its relation to the ground. It will be apparent also that the invention provides a novel control means which may be at all times easily operated from the driver's seat of the tractor.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An earth working machine having an earth scraper, draft means pivotally connected with said earth scraper, a flexible means connected with said scraper at opposite sides of the pivotal connection, and means cooperating with said flexible means to control the operation of said scraper.

2. An earth working machine having an earth scraper, draft means pivotally connected with said earth scraper to permit relative movement about a horizontal axis, a flexible means connected with said scraper at opposite sides of the pivotal connection, and means cooperating with said flexible means to control the operation of said scraper.

3. An earth working machine having an earth scraper, draft means pivotally connected with said earth scraper, means extending forwardly from said scraper and comprising a flexible member having its opposite ends connected with said scraper at opposite sides of the pivotal connection and means cooperating with said flexible member to control the operation of said scraper, said last-mentioned means being mounted on a forward portion of the draft means.

4. An earth working machine having an earth scraper, draft means pivotally connected with said earth scraper, and scraper setting and control mechanism comprising members connected with said scraper at opposite sides of the pivotal connection, and provisions for interconnecting said members whereby to cause concomitant motion of said members in opposite directions.

5. An earth working machine having an earth scraper, draft means pivotally connected with said earth scraper, and scraper setting and control mechanism comprising members connected with said scraper at opposite sides of the pivotal connection, provisions for interconnecting said members whereby to cause concomitant motion of said members in opposite directions, and means for controlling said interconnecting provisions.

6. An earth working machine having an earth scraper, and draft and scraper-setting means for the scraper, said draft and scraper-setting means extending forwardly from the scraper and comprising a rigid draft member pivotally connected with the scraper for movement of the latter about a horizontal axis, a flexible member secured to the scraper at one side of said pivotal connection and extending forwardly from the scraper to the forward portion of the draft and scraper-setting means, and means for permitting and controlling longitudinal movement of the flexible member relative to the remainder of the draft and scraper-setting mechanism, said last-mentioned means including gripping mechanism for restraining movement of said flexible member in one direction only.

7. An earth working machine having an earth scraper, and draft and scraper-setting means for the scraper, said draft and scraper-setting means extending forwardly from the scraper and comprising a rigid draft member pivotally connected with the scraper for movement of the latter about a horizontal axis, a flexible member secured to the scraper at one side of said pivotal connection and extending forwardly from the scraper to the forward portion of the draft and scraper-setting means, and means for permitting and controlling longitudinal movement of the flexible member relative to the remainder of the draft and scraper-setting mechanism, said last-mentioned means including gripping mechainsm for restraining movement of said flexible member in one direction only and manually operable provisions for modifying the action of the gripping mechanism to permit free movement of the flexible member in both directions.

8. An earth working machine comprising an earth scraper, rigid inarticulate draft means adapted to be connected with a motive means such as a tractor pivotally connected with the sides of said scraper, scraper setting and control mechanism including a member in operative connection with said scraper at one side of said pivotal connection for controlling the dumping of said scraper, means associated therewith for preventing rotative movement of said earth scraper in a direction for dumping, and additional means in operative connection with said scraper for effecting minor rotative adjustments of said scraper independently of said first mentioned member.

9. An earth working machine comprising an earth scraper, draft means pivotally connected with said earth scraper, scraper setting and control mechanism comprising interconnected members connected with said scraper at opposite sides of the pivotal connection, gripping means associated therewith for normally preventing rotation of said scraper in a direction for dumping, and additional means associated with said scraper for effecting minor rotative adjustments of said scraper independently of said members and gripping means.

In testimony whereof we hereto affix our signatures.

WILLIAM ALBERT PERRY.
GEORGE DANIEL TOY.